(12) United States Patent
Jayaraj et al.

(10) Patent No.: US 9,093,899 B2
(45) Date of Patent: Jul. 28, 2015

(54) TIMER BASED PFM EXIT CONTROL METHOD FOR A BOOST REGULATOR

(71) Applicant: Micrel, Inc., San Jose, CA (US)

(72) Inventors: Vinit Jayaraj, Santa Clara, CA (US); Jayant Rao, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 14/042,341

(22) Filed: Sep. 30, 2013

(65) Prior Publication Data

US 2015/0091544 A1    Apr. 2, 2015

(51) Int. Cl.
*H02M 3/156*    (2006.01)

(52) U.S. Cl.
CPC ..................................... *H02M 3/156* (2013.01)

(58) Field of Classification Search
CPC .............. H03M 3/156; H03M 3/1588; H03M 2001/0009; Y02B 70/1466
USPC .......................................... 323/282, 284, 322
See application file for complete search history.

(56) References Cited

U.S. PATENT DOCUMENTS

| | | |
|---|---|---|
| 2006/0273772 A1 | 12/2006 | Groom |
| 2010/0225293 A1 | 9/2010 | Wang et al. |
| 2010/0320983 A1 | 12/2010 | Wu |
| 2011/0006744 A1 | 1/2011 | Dearborn |
| 2011/0012658 A1 | 1/2011 | Hsieh et al. |
| 2011/0156684 A1* | 6/2011 | da Silva et al. ............... 323/284 |
| 2012/0049825 A1 | 3/2012 | Chen et al. |

* cited by examiner

*Primary Examiner* — Timothy J Dole
*Assistant Examiner* — Alan Stewart
(74) *Attorney, Agent, or Firm* — Van Pelt, Yi & James LLP

(57) ABSTRACT

A control circuit in a PFM/PWM boost switching regulator includes a timer based PFM exit control circuit configured to receive a first control signal for controlling a main power switch, a zero-cross signal indicative of an inductor current having reached zero current value, and a timer reference signal indicative of a timer threshold duration. The timer based PFM exit control circuit assesses an idle time of the inductor current based on the first control signal and the zero-cross signal. The timer based PFM exit control circuit asserts the PFM exit signal in response to the idle time decreasing below a level being equal to or less than the timer threshold duration, and the boost switching regulator transitions out of the PFM mode and into the PWM mode in response to the PFM exit signal being asserted.

17 Claims, 8 Drawing Sheets

TIMER BASED PFM EXIT CONTROL METHOD FOR A BOOST REGULATOR

BACKGROUND OF THE INVENTION

Switch mode power supplies or switching regulators, also referred to as DC-to-DC converters, are often used to convert an input supply voltage to a desired output voltage. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or "buck-boost converter," provides both step-up and step-down functions.

The operation of the switching regulator is well known and is generalized as follows. A power switch is turned on to apply energy to an inductor to allow the current through the inductor to build up. When the power switch is turned off, the voltage across the inductor reverses and energy is transferred to an output capacitor and the load. A relatively constant output voltage is maintained by the output capacitor.

Increasingly, power supply systems for mobile applications are being designed using switching regulators having both PFM (Pulse Frequency Modulation) and PWM (Pulse Width Modulation) modes of operation so as to satisfy requirements for high efficiency over light and heavy load conditions. In general, PWM mode of operation is preferred for providing maximum efficiency at heavy load conditions while PFM mode of operation is preferred for providing maximum efficiency at light load conditions. A problem faced by these types of power supply system is how to handle the transitions between PFM mode to PWM mode and vice versa in a clean and efficient manner.

FIG. 1 is a schematic diagram of a conventional boost switching regulator configured with PFM and PWM feedback control. Referring to FIG. 1, a boost regulator 10 includes a switch control logic circuit 24 coupled to drive a first power switch M1 and a second power switch M2. In most cases, switch control logic circuit 24 is a non-overlapping gate drive generation circuit and generates control signals NGATE and PGATE that are non-overlapping. The boost regulator 10 further includes an inductor L1 and an output capacitor $C_{OUT}$. The boost regulator 10 receives an input voltage $V_{IN}$ on a node 12 and provides an output voltage $V_{OUT}$ having a substantially constant magnitude on a node 16 for driving a load 35. The output voltage $V_{OUT}$ is fed back to a feedback node 18 of the boost regulator 10 to form a feedback control loop to realize regulation and control of the output voltage. The output voltage may be fed back to the feedback node directly or through a resistor divider. In the present illustration, a resistor divider circuit including resistors R1 and R2 divides down the output voltage $V_{OUT}$ to provide a feedback voltage $V_{FB}$ (on node 18) to the feedback control loop.

The feedback control loop of boost regulator 10 includes a PFM control loop 40 and a PWM control loop 44. The PFM control loop 40 compares the feedback voltage $V_{FB}$ to a first reference voltage $V_{REF1}$ and generates PFM drive signals 42 including a PFM_NDRV signal for the NMOS power switch M1 and a PFM_PDRV signal for the PMOS power switch M2. The PWM control loop 44 compares the feedback voltage $V_{FB}$ to a second reference voltage $V_{REF2}$ and generates PWM drive signals 46 including a PWM_NDRV signal for switch M1 and a PWM_PDRV signal for switch M2. A mode selection circuit 48 selects either the PFM or PWM mode of operation and provides the selected drive signals to the switch control logic circuit 24. That is, the mode selection circuit 48 selects either the pair of PFM drive signals 42 or the pair of PWM drive signals 46. The selected drive signals NDRV and PDRV are provided to the switch control logic circuit 24. The switch control logic circuit 24 generates the control signals NGATE (node 28) and PGATE (node 32) for driving the first power switch M1 and the second power switch M2. The NGATE and PGATE signals may be buffered by buffers 26 and 30 respectively.

The control signals NGATE and PGATE are operative to turn power switch M1 and M2 on and off alternately so that a switching voltage $V_{SW}$ is generated at the switching node 14. In particular, when the switch control logic circuit 24 drives the power switch M1 to turn on and drives the power switch M2 to turn off, inductor L1 has the input voltage $V_{IN}$ impressed upon it, and the current through the inductor builds up. When the switch control logic circuit 24 drives the power switch M1 to turn off and drives the power switch M2 to turn on, the voltage across the inductor L1 reverses ("fly back") and inductor L1 delivers energy through switch M2 to the output capacitor $C_{OUT}$ and the load 35. The output capacitor $C_{OUT}$ filters the ramping inductor current to generate a substantially constant output voltage $V_{OUT}$ at the output node 16.

For the PFM feedback control loop to operate correctly and reliably, a certain amount of voltage ripple is required by the feedback control loop. More specifically, because of the switching action at the power switches, all switch-mode regulators generate an output current ripple through the switched inductor L1. This current ripple manifests itself as an output voltage ripple principally due to the equivalent series resistance (ESR) in the output capacitor $C_{OUT}$ placed in parallel with the load. The ESR of the output capacitor $C_{OUT}$ is denoted as a resistor $R_{ESR}$ in FIG. 1. Recently, low ESR capacitors are preferred to realize improved efficiency and low output voltage ripple in switching regulators. However, the low ESR capacitors do not generate sufficient output voltage ripple for meaningful feedback control. The desire for low output voltage ripple at the output voltage contradicts with the PFM feedback control loop requirement of a certain amount of ripple for reliable operation. The low output ripple signal (typically less than 1 mV) is often too small to be meaningfully used by the PFM feedback control loop of the switching regulator. Ripple injection circuits to introduce a ripple signal in the feedback loop have been described for buck switching regulators. For example, U.S. Pat. Nos. 7,482,791 and 7,482,793 illustrate examples of ripple injection circuits that can be applied in buck regulators using fixed on-time control.

Boost regulators using both PFM and PWM operation modes employ certain control schemes to control the transitions between PFM and PWM modes and vice versa. In most cases, the output voltage $V_{OUT}$ is used to determine the transition point. However, when the switching regulator employs ripple injection, the feedback voltage is no longer a linear divided down representation of the output voltage and thus does not provide a reliable measure of when the power supply system needs to exit PFM mode and enter into PWM mode to sustain higher loads.

BRIEF DESCRIPTION OF THE DRAWINGS

Various embodiments of the invention are disclosed in the following detailed description and the accompanying drawings.

DETAILED DESCRIPTION

Figure 1:
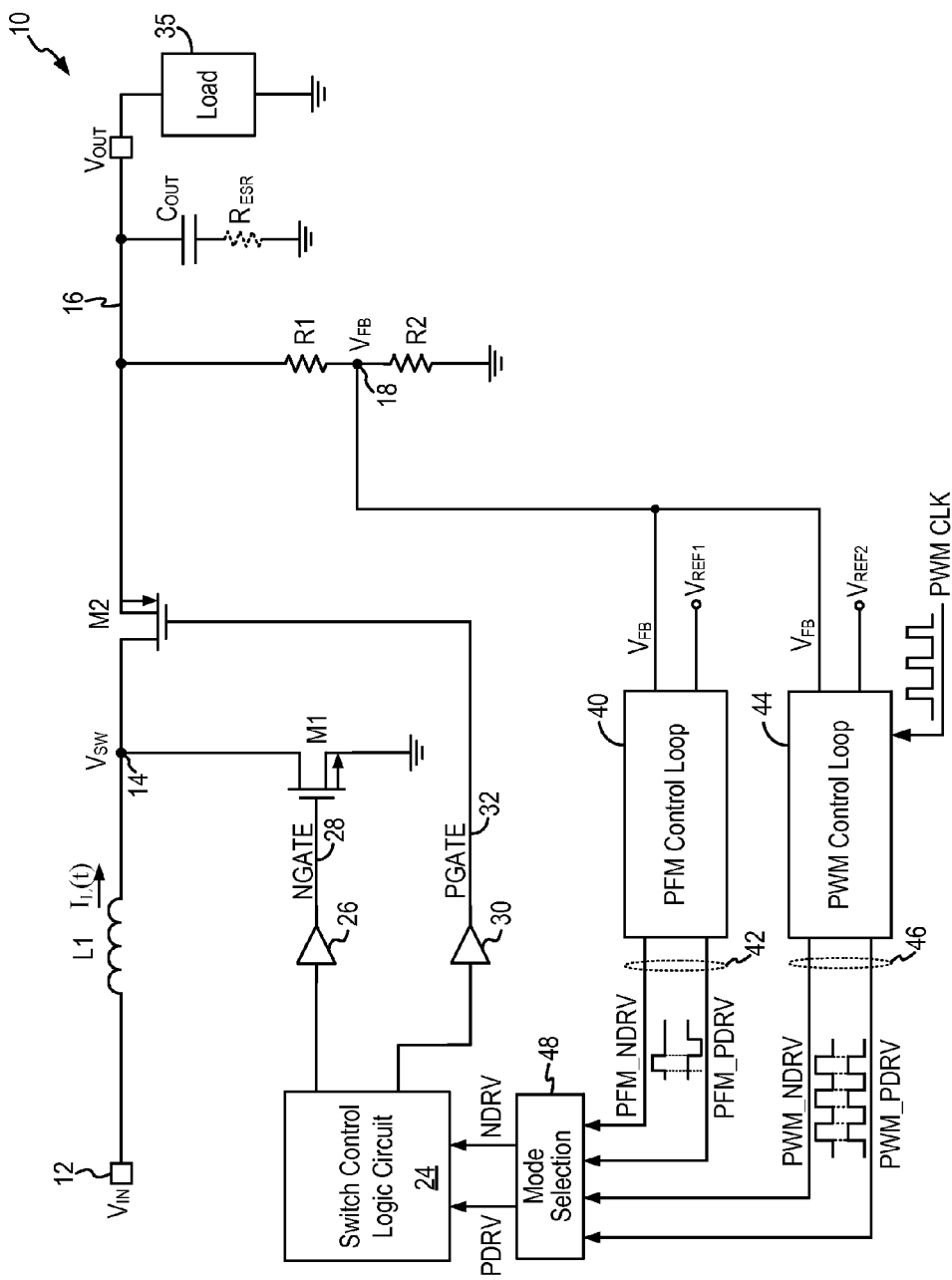
FIG. 1 is a schematic diagram of a conventional boost switching regulator configured with PFM and PWM feedback control.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a boost switching regulator employing both PWM (Pulse Width Modulation) and PFM (Pulse Frequency Modulation) operation modes uses a timer based method to determine the transition point to exit the PFM mode and enter the PWM mode. In some embodiments, the timer based PFM exit control circuit and method sense the idle time between the inductor current pulses and use a decreasing idle time as an indicator for exiting the PFM operation mode. With the boost switching regulator being operated in the PFM mode, as the load condition increases, the idle time decreases. When the idle time becomes less than a given threshold, the timer based PFM exit control method determines that the boost switching regulator should exit the PFM mode of operation. The timer based PFM exit control method is particularly advantageous when applied to PFM/PWM boost regulators that employ ripple injection in the PFM mode.

PFM based architectures are increasingly being used in power supply systems for mobile and handheld applications due to their superior efficiencies at light load. For instance, power supply systems for mobile applications are being designed using switching regulators having both PWM and PFM modes of operation so as to satisfy requirements for high efficiency over heavy and light load conditions. In general, PWM mode of operation is preferred for providing maximum efficiency and fast transient response at heavy load conditions while PFM mode of operation is preferred for providing maximum efficiency at light load conditions. A clean transition from the PFM mode to the PWM mode is desired as load conditions changes from light to heavy loads. The timer based PFM exit control circuit and method of the present invention provides a low-cost and reliable solution to ensure a smooth and clean transition from the PFM mode to the PWM mode in a PFM/PWM power supply system.

In the present description, the "idle time" in a switching regulator refers to the time period when both power switches of the switching regulator are turned off and the inductor current is zero during the PFM mode of operation. The idle time is the time between the point at which the inductor current reaches zero current value when the synchronous rectifier M2 is turned off and the point at which the PFM control loop commands another switching cycle and the main power switch M1 is turned on. During the idle time, the output voltage ($V_{OUT}$) falls and the feedback voltage ($V_{FB}$) decreases towards the reference voltage ($V_{REF}$). When a boost regulator is operating under light load conditions, it may take a long time for the feedback voltage ($V_{FB}$) to decay to the reference voltage ($V_{REF}$) because the load current ($I_O$) is very small. Thus, the idle time may be long during light load conditions. Eventually, the feedback voltage ($V_{FB}$) will decrease below the reference voltage $V_{REF}$ and the next switching cycle is initiated.

Figure 2:
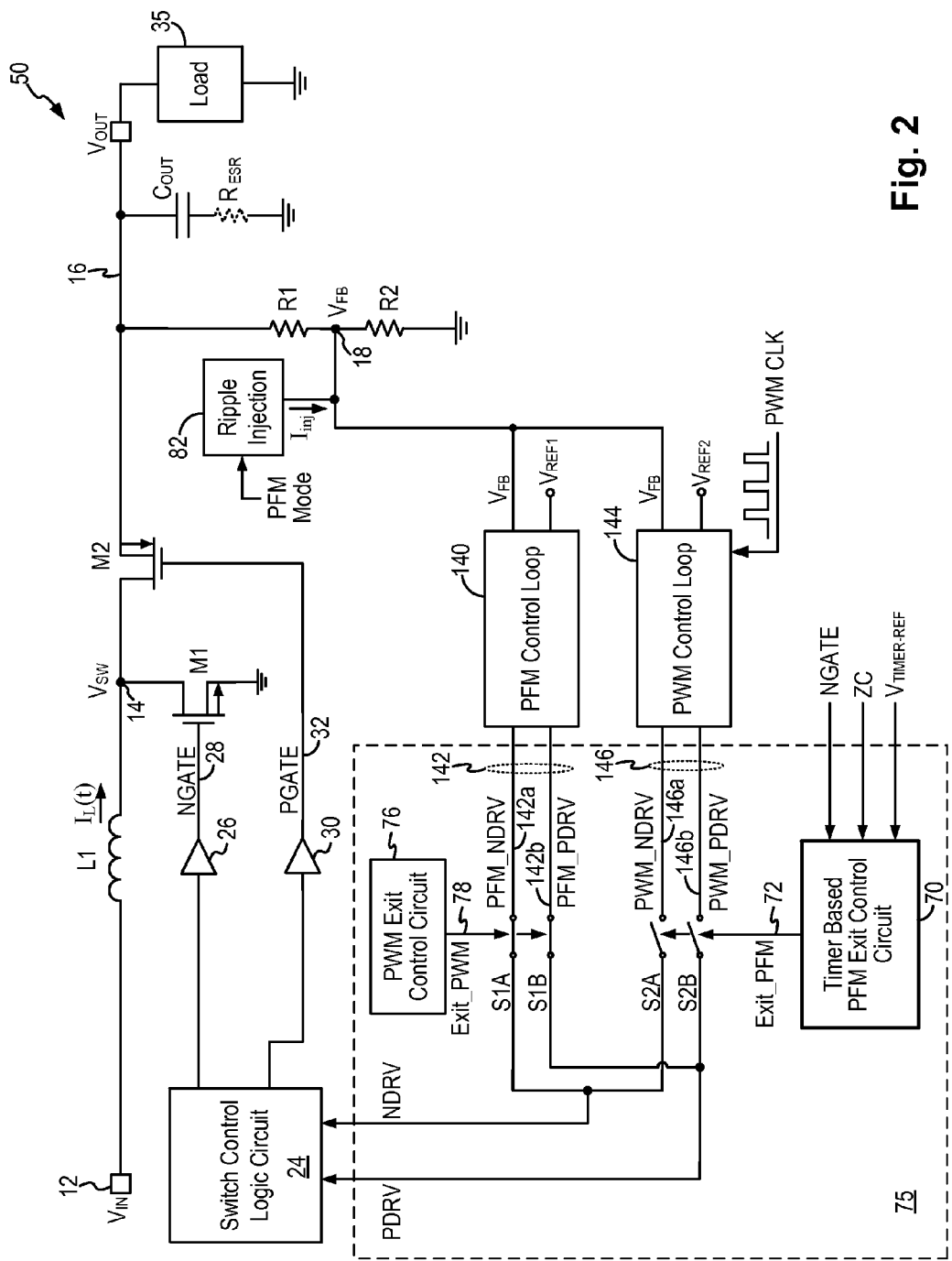
FIG. 2 is a schematic diagram of a PFM/PWM boost switching regulator implementing the timer based PFM exit control circuit according to one embodiment of the present invention.

FIG. 2 is a schematic diagram of a PFM/PWM boost switching regulator implementing the timer based PFM exit control circuit according to one embodiment of the present invention. Referring to FIG. 2, a boost switching regulator (or "boost regulator") 50 includes a switch control logic circuit 24 coupled to drive a first power switch M1 and a second power switch M2. In the present embodiment, the first power switch M1 is an NMOS transistor and is sometimes referred to as the main power switch while the second power switch M2 is a PMOS transistor and is sometimes referred to as a synchronous rectifier. The boost regulator 50 further includes an inductor L1 and an output capacitor $C_{OUT}$. The output capacitor $C_{OUT}$ may have zero or very small equivalent series resistance ($R_{ESR}$). The boost regulator 50 receives an input voltage $V_{IN}$ on a node 12 and provides an output voltage $V_{OUT}$ having a substantially constant magnitude on a node 16 for driving a load 35. The output voltage $V_{OUT}$ is fed back to a feedback node 18 of the boost regulator 50 to form a feedback control loop to realize regulation and control of the output voltage. The output voltage may be fed back to the feedback node directly or through a resistor divider. In the present embodiment, a resistor divider circuit including resistors R1 and R2 divides down the output voltage $V_{OUT}$ to provide a feedback voltage $V_{FB}$ (on node 18) to the feedback control loop.

The feedback control loop of boost regulator 50 includes a PFM control loop 140 and a PWM control loop 144. The PFM control loop 140 compares the feedback voltage $V_{FB}$ to a first reference voltage $V_{REF1}$ and generates PFM drive signals 142 including a PFM_NDRV signal (142a) for the NMOS power switch M1 and a PFM_PDRV signal (142b) for the PMOS power switch M2. The PWM control loop 144 compares the feedback voltage $V_{FB}$ to a second reference voltage $V_{REF2}$ and generates PWM drive signals 146 including a PWM_NDRV signal (146a) for switch M1 and a PWM_PDRV signal (146b) for switch M2. The PWM control loop 144 also receives a PWM clock signal (PWM CLK).

A mode selection circuit 75 selects either the PFM or PWM mode of operation and provides the selected drive signals to the switch control logic circuit 24. That is, the mode selection circuit 75 selects either the pair of PFM drive signals 142 or the pair of PWM drive signals 146. The selected drive signals NDRV and PDRV are then provided to the switch control logic circuit 24. The switch control logic circuit 24 generates the control signals NGATE (node 28) and PGATE (node 32) for driving the first power switch M1 and the second power switch M2. The NGATE and PGATE signals may be buffered by buffers 26 and 30 respectively. The control signals NGATE and PGATE are operative to turn power switch M1 and M2 on and off alternately so that a switching voltage $V_{SW}$ is generated at the switching node 14. In particular, when the switch control logic circuit 24 drives the power switch M1 to turn on and drives the power switch M2 to turn off, inductor L1 has the input voltage $V_{IN}$ impressed upon it, and the current through the inductor builds up. When the switch control logic circuit 24 drives the power switch M1 to turn off and drives the power switch M2 to turn on, the voltage across the inductor L1 reverses ("fly back") and inductor L1 delivers energy through switch M2 to the output capacitor $C_{OUT}$ and the load 35. The output capacitor $C_{OUT}$ filters the ramping inductor current to generate a substantially constant output voltage $V_{OUT}$ at the output node 16.

More specifically, the mode selection circuit 75 includes switches S1A and S1B which are controlled to connect the PFM drive signals 142 to the switch control logic circuit 24. The mode selection circuit 75 further includes switches S2A and S2B which are controlled to connect the PWM drive signals 146 to the switch control logic circuit 24. Switches S1A and S1B are controlled by an Exit_PWM signal 78 generated by a PWM exit control circuit 76. Switches S2A and S2B are controlled by an Exit_PFM signal 72 generated by a timer based PFM exit control circuit 70 in embodiments of the present invention. In operation, switches S1A and S1B operate simultaneously—that is both switches open or close at the same time. Switches S2A and S2B also operate simultaneously—that is both switches open or close at the same time. Switches S1A/S1B pair and Switches S2A and S2B pair operate complementary—that is, only one pair is closed at a time. In the switching regulator configuration shown in FIG. 2, the PFM/PWM boost switching regulator 50 is configured in the PFM mode of operation with switches S1A and S1B closed and switches S2A and S2B open.

In the present embodiment, the PWM control loop 144 is implemented as an error amplifier based control loop and therefore does not require any ripple signal on the feedback voltage for stability of operation. However, the PFM control loop 140 is implemented using a comparator based control loop. For the comparator-based PFM feedback control loop to operate correctly and reliably, a certain amount of voltage ripple is required in the feedback voltage to ensure stability of operation. In particular, because of the switching action at the power switches, all switch-mode regulators generate an output current ripple through the switched inductor L1. This current ripple manifests itself as an output voltage ripple principally due to the equivalent series resistance (ESR) in the output capacitor $C_{OUT}$ placed in parallel with the load. The ESR of the output capacitor $C_{OUT}$ is denoted as a resistor $R_{ESR}$ in FIG. 2. When low ESR capacitors are used to realize low output voltage ripple in switching regulators, the low ESR capacitors do not generate sufficient output voltage ripple for meaningful feedback control in a comparator-based feedback control loop. The desire for low output voltage ripple at the output voltage contradicts with the comparator-based PFM feedback control loop requirement of a certain amount of ripple for reliable operation. The low output ripple signal (typically less than 1 mV) is often too small to be meaningfully used by the PFM feedback control loop of the switching regulator. Accordingly, ripple injection circuits are used to introduce a ripple signal in the feedback loop of a switching regulator.

In the present embodiment, a ripple injection circuit 82 is used to provide an injected ripple signal during the PFM mode of operation. In embodiments of the present invention, the ripple injection circuit 82 is implemented based on the ripple injection circuit and method described in copending and commonly assigned U.S. patent application Ser. No. 13/901,407, entitled "Optimal Ripple Injection for a Boost Regulator," of the same inventors hereof, which patent application is incorporated herein by reference in its entirety.

In the operation of the boost regulator 50, the PWM mode of operation is selected for heavy load conditions and the PFM mode of operation is selected for light load conditions. Boost regulator 50 includes mode selection circuit 75 to control the transition between the PFM and PWM operation modes based on load conditions. In the present illustration, the mode selection circuit 75 selects either the PFM or PWM mode of operation and provides the selected drive signals NDRV and PDRV to the switch control logic circuit 24. The mode selection circuit 75 operates based on control signals from the PWM Exit control circuit and the PFM Exit control circuit. FIG. 2 illustrates one example implementation of the mode selection circuit. The exact implementation of the mode selection circuit 75 is not critical to the practice of the present invention and other circuit configuration and implementation may be used in other embodiments of the present invention.

For instance, when the boost regulator 50 is operated in the PWM mode, a PWM exit control circuit 76 may be used to control the transition from the PWM mode to the PFM mode when the load decreases below a given threshold. The PWM exit control circuit 76 provides the Exit_PWM signal (node 78) to switches S1A and S1B to cause the switches to close and to connect the drive signals to the PFM control loop 140. The PWM exit control circuit 76 may be implemented using appropriate control circuitry, presently known or to be developed, and the exact implementation of the PWM exit control circuit 76 is not critical to the practice of the present invention.

On the other hand, when the boost regulator 50 is operated in the PFM mode, ripple injection is applied by the ripple injection circuit 82 to the feedback voltage $V_{FB}$. When ripple injection thus introduced, the DC voltage level of the feedback voltage is changed so that the rippled-injected feedback voltage cannot be accurately applied to determine the transition point for exiting PFM mode. In embodiments of the present invention, the boost regulator 50 uses the timer based PFM exit control circuit 70 to control the transition from the PFM mode to the PWM mode. With the use of a timer based control method, the boost regulator 50 can ensure a smooth and clean transition from the PFM mode to the PWM mode when the load condition increases. In operation, the PFM exit control circuit 70 provides the Exit_PFM signal (node 72) to switches S2A and S2B to cause the switches to close and to connect the drive signals to the PWM control loop 140.

Figure 3:
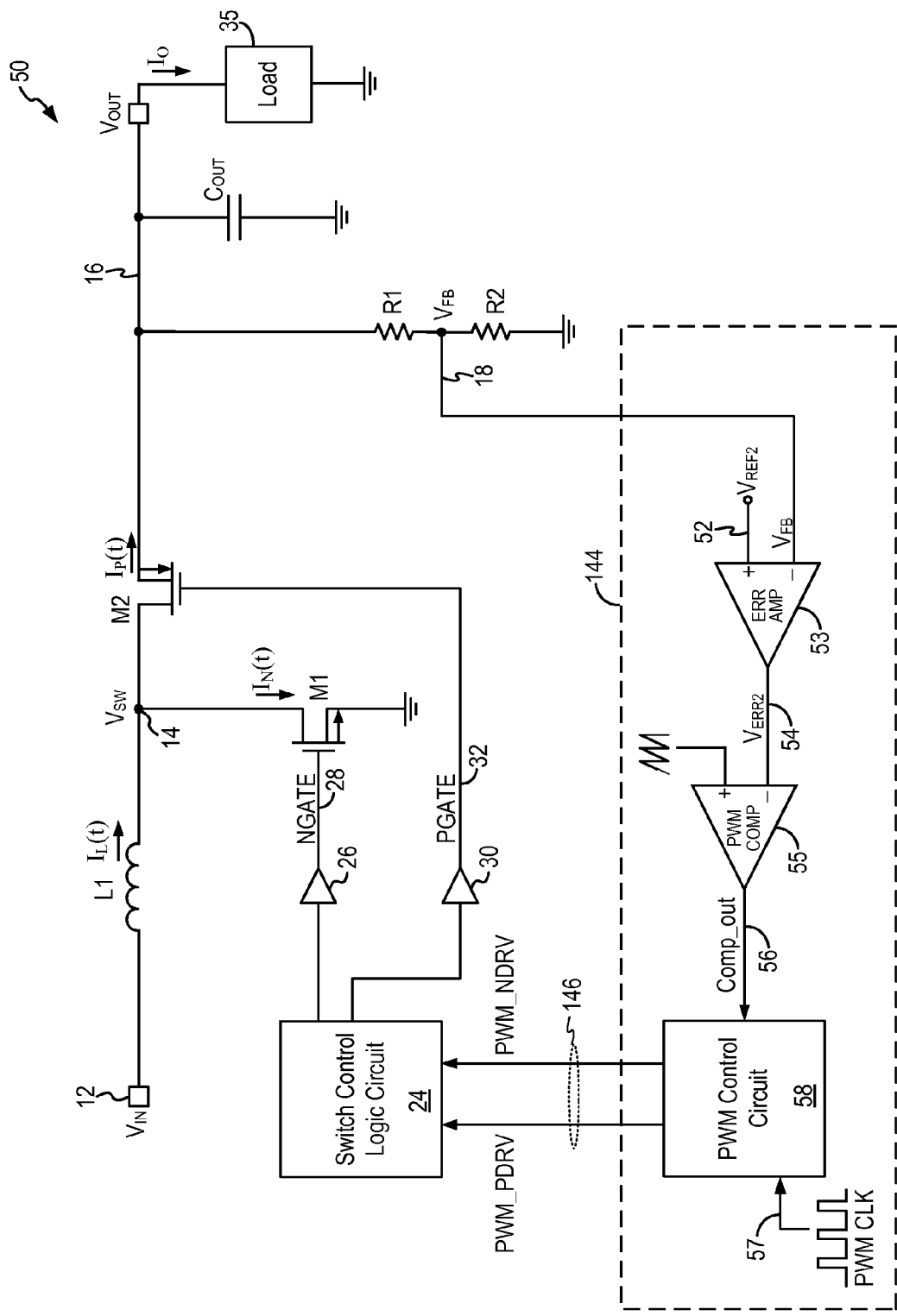
FIG. 3 is a schematic diagram of the boost regulator of FIG. 2 illustrating the configuration of the PWM feedback control loop according to one embodiment of the present invention.

FIG. 3 is a schematic diagram of the boost regulator of FIG. 2 illustrating the configuration of the PWM feedback control loop according to one embodiment of the present invention. As described above, boost regulator 50 implements a PWM feedback control loop 144 that is error amplifier based. Referring to FIG. 3, the PWM feedback control loop 144 includes an error amplifier 53 having a positive input terminal configured to receive the reference voltage $V_{REF2}$ (node 52) and a negative input terminal configured to receive the feedback voltage $V_{FB}$ (node 18). No ripple injection is applied to the feedback voltage $V_{FB}$ in the PWM operation mode. The output of the error amplifier 53 is a second error signal $V_{ERR2}$ (node 54) which is coupled to a PWM comparator 55 to be compared with a ramp waveform. The PWM comparator 55 generates a comparator output signal Comp_out (node 56) which is coupled to a PWM control circuit 58. The PWM control circuit 58 receives the PWM clock signal (PWM CLK) (node 57) and the comparator output signal Comp_out (node 56) and generates the PWM drive signals 146, including the PWM_NDRV signal and the PWM_PDRV signals. The PWM drive signals 146 are provided to the switch control logic circuit 24 which generates the control signals NGATE and PGATE for driving the first and second power switches M1 and M2.

Figure 4:
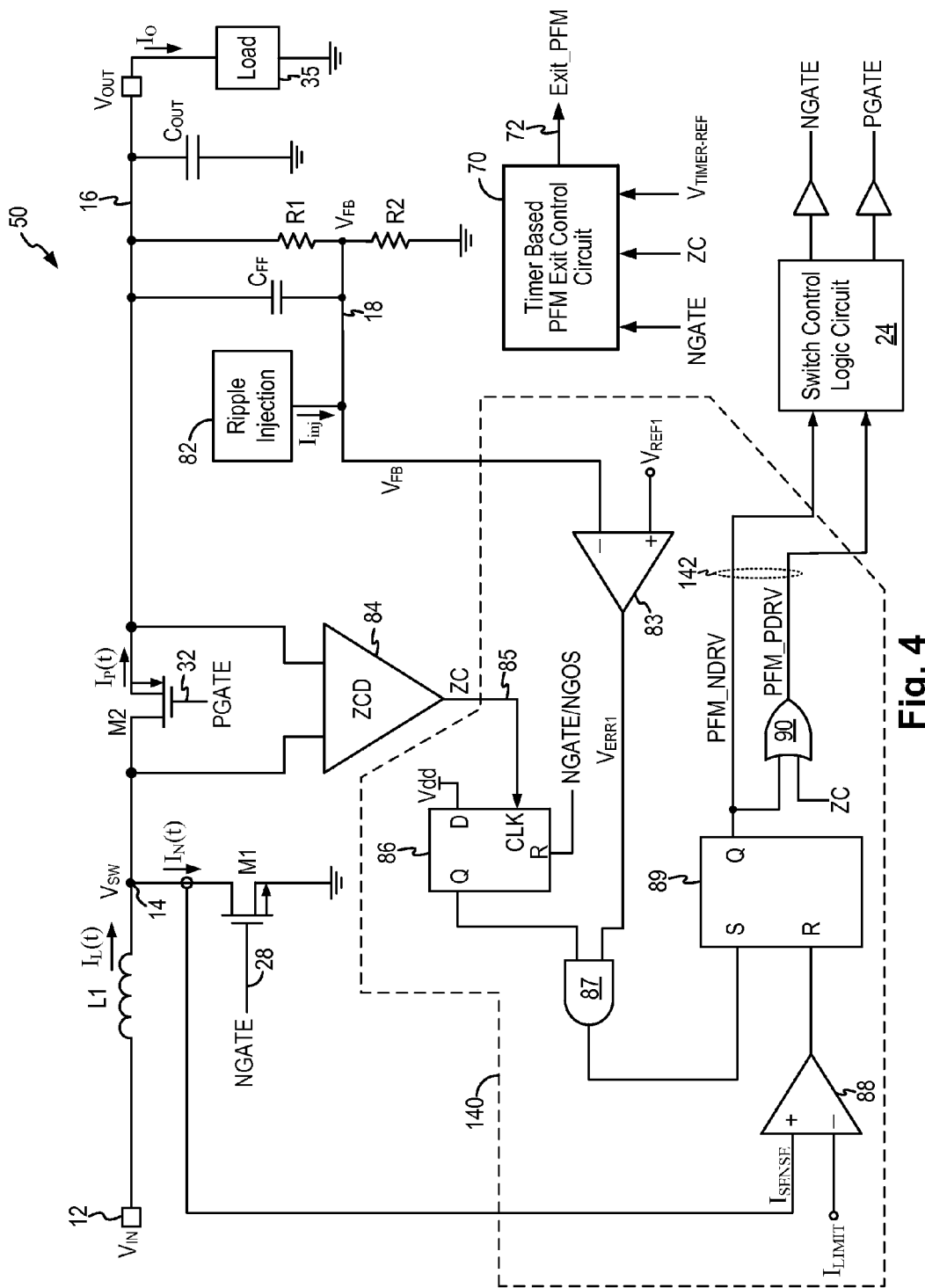
FIG. 4 is a schematic diagram of the boost regulator of FIG. 2 illustrating the configuration of the PFM feedback control loop according to one embodiment of the present invention.

FIG. 4 is a schematic diagram of the boost regulator of FIG. 2 illustrating the configuration of the PFM feedback control loop according to one embodiment of the present invention. As described above, boost regulator 50 implements a PFM feedback control loop 140 that is comparator based. Referring to FIG. 4, the PFM feedback control loop 140 includes a comparator 83 having a positive input terminal configured to receive the reference voltage $V_{REF1}$ and a negative input terminal configured to receive the feedback voltage $V_{FB}$ (node 18). The ripple injection circuit 82 introduces a ripple current signal $I_{inj}$ to the feedback voltage $V_{FB}$ so that the comparator 83 receives a ripple-injected feedback voltage signal. The comparator 83 generates the first error signal $V_{ERR1}$ which is coupled to an AND logic gate 87.

Meanwhile, a zero-cross detector (ZCD) 84 is coupled across the second power switch M2 (the synchronous rectifier) to measure the inductor current $I_P(t)$ that flows through the second power switch M2. The inductor current $I_P(t)$ that flows through the second power switch M2 is sometimes referred as the synchronous rectifier current as the second power switch M2 functions as the synchronous rectifier. Zero-cross detector 84 detects when the synchronous rectifier current $I_P(t)$ drops to zero and asserts a zero-cross signal ZC (node 85) in response to the current $I_P(t)$ dropping to zero current value. The zero-cross signal ZC is coupled to the PFM feedback control loop 140. In particular, the zero-cross signal ZC is coupled to the clock input terminal of a D-flip-flop 86. The data input D of the D-flip-flop 86 is connected to a logical high value, such as the Vdd voltage. The reset input R of the D-flip-flop 86 is coupled to receive the NGATE control signal. In some embodiments, the reset input R of the D-flip-flop 86 may be coupled to receive a one-shot signal NGOS generated from the NGATE control signal.

Accordingly, D-flip-flop 86 is reset when the NGATE signal is asserted, that is, when the power switch M1 is to be turned on. Then, when the NGATE signal is deasserted, the D-flip-flop 86 passes the logical high value at the data input D to the output Q when clocked by the zero-cross signal ZC. The output Q of the D-flip-flop 86 is coupled to the AND logic gate 87. At AND logic gate 87, when both the first error signal $V_{ERR1}$ and the output Q of the D-flip-flop 86 are asserted, the output of AND logic gate 87 will be asserted. The output of AND logic gate 87 is coupled to the set input terminal S of a SR-flip-flop 89. Meanwhile, the inductor current component $I_N(t)$ at the first power switch M1 is measured and coupled to a comparator 88 to be compared with a current limit $I_{LIMIT}$. The output of comparator 88 is coupled to the reset input terminal R of the SR-flip-flop 89. As thus configured, when the inductor current component $I_N(t)$ exceeds the current limit $I_{LIMIT}$, the SR-flip-flop 89 is reset. When the inductor current component $I_N(t)$ is within the current limit $I_{LIMIT}$, the SR-flip-flop 89 is set by the output of AND logic gate 87. The SR-flip-flop 89 generates the PFM drive signals 142. In particular, the output Q of the SR-flip-flop 89 is the PFM drive signal PFM_NDRV for the NMOS power switch M1. The output Q of the SR-flip-flop 89 and the zero-cross signal ZC are coupled to an OR logic gate 90 to generate the PFM drive signal PFM_PDRV for the PMOS power switch M2. The PFM drive signals 142 are provided to the switch control logic circuit 24 which generates the control signals NGATE and PGATE for driving the first and second power switches M1 and M2.

When the boost regulator 50 is operated in the PFM mode, the boost regulator 50 needs to determine when the load condition increases such that it is necessary to exit the PFM mode and enter the PWM mode of operation. Conventional mode transition methods determine the point of PFM mode exit based upon information from the feedback voltage $V_{FB}$ (node 18) of the feedback control loop. The feedback voltage $V_{FB}$ is typically derived from a resistor divider from the output voltage $V_{OUT}$. Without any external injection, the feedback voltage $V_{FB}$ is a divided down representation of the output voltage $V_{OUT}$ and has a linear divided-down relationship with the output voltage $V_{OUT}$ at all times. However, in boost regulators, such as boost regulator 50, that use ripple injection in the PFM mode of operation for stability purposes, the linear relationship between the output voltage $V_{OUT}$ and the feedback voltage $V_{FB}$ is broken. The feedback voltage $V_{FB}$ is no longer a divided down ratio from the output voltage $V_{OUT}$ at all times due to the externally induced ripple injection signal $I_{inj}$. Thus, the feedback voltage $V_{FB}$ cannot be used as a reliable exact representation of output voltage to determine the point of PFM mode exit and make a clean transition into PWM mode.

Figure 5:
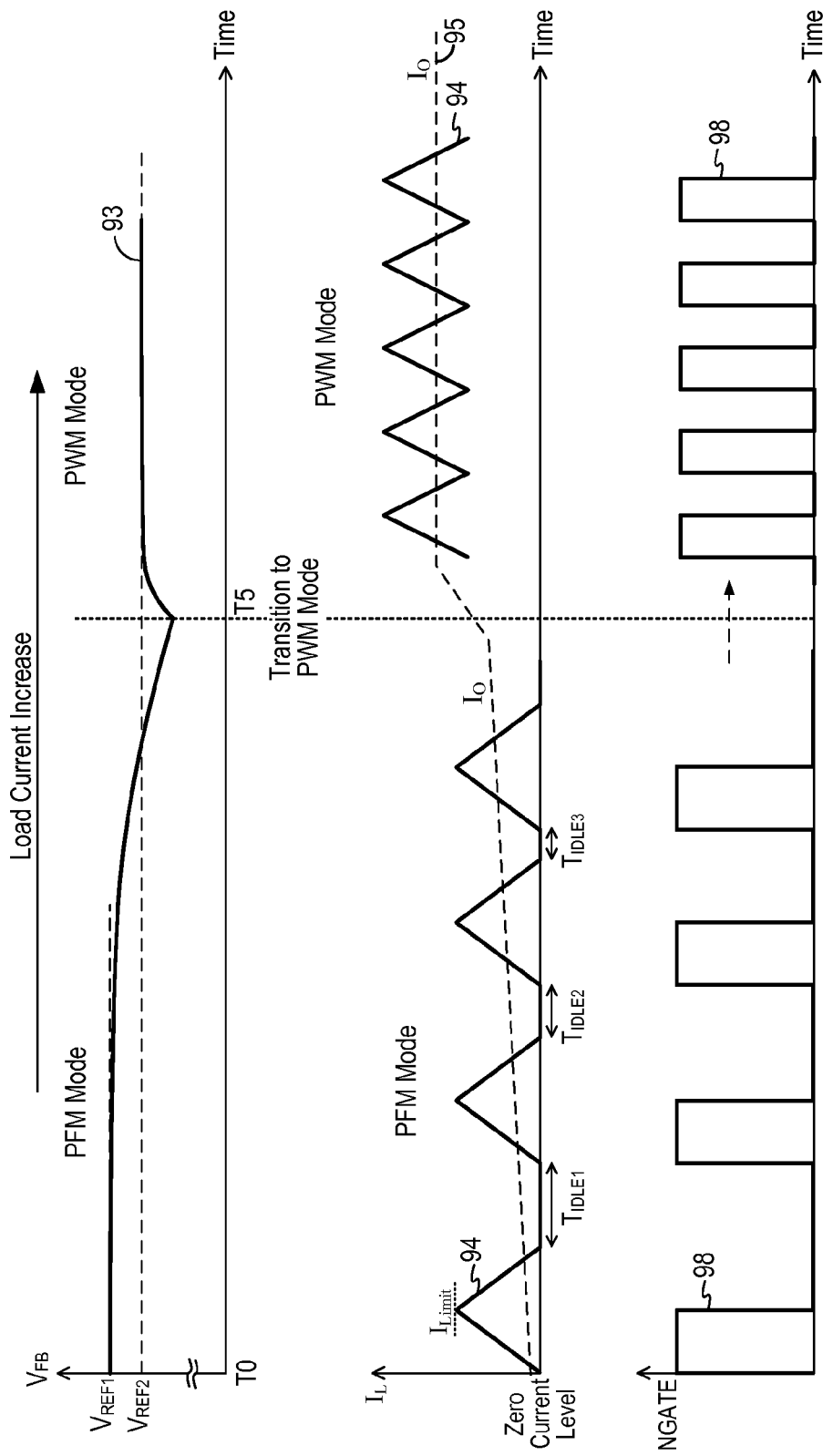
FIG. 5 is a timing diagram illustrating the operation of the boost regulator of FIG. 2 according to one embodiment of the present invention.

FIG. 5 is a timing diagram illustrating the operation of the boost regulator of FIG. 2 according to one embodiment of the present invention. In particular, FIG. 5 illustrates the behavior of the feedback voltage $V_{FB}$ (curve 93), the inductor current $I_L$ (curve 94) and the control signal NGATE (curve 98) as the load current is increasing. The load current $I_O$ is shown as a dotted line 95. In the present illustration, the feedback voltage $V_{FB}$, which may be a divided down voltage of the output voltage $V_{OUT}$, is regulated to the reference voltages $V_{REF1}$ or $V_{REF2}$. In some cases, the output voltage $V_{OUT}$ is coupled directly as the feedback voltage without any voltage division. In that case, the feedback voltage $V_{FB}$ is the output voltage $V_{OUT}$ and the output voltage $V_{OUT}$ is regulated to the reference voltages $V_{REF1}$ or $V_{REF2}$.

At time T0, the boost regulator 50 is assumed to be operating in the PFM mode under a light load condition. The feedback voltage $V_{FB}$ is regulated to the reference voltage $V_{REF1}$. Under the PFM mode, the NMOS power switch M1 is turned on periodically (control signal NGATE, curve 98) to charge up the inductor current $I_L$. When the NMOS power switch M1 is turned off, the PMOS power switch M2 is turned on and the inductor current $I_L$ decreases to zero current level at which point power switch M2 turns off. When both power switches M1 and M2 are turned off, the boost regulator 50 enters the idle time $T_{IDLE}$. The PFM feedback control loop regulates the output voltage of the boost regulator to maintain the feedback voltage $V_{FB}$ at the reference voltage $V_{REF1}$. When the feedback voltage $V_{FB}$ drops below the reference voltage $V_{REF1}$, another switching cycle is started by the next pulse of the control signal NGATE.

As the load current $I_O$ (curve 95) increases, the idle time between switching cycle decreases. Thus, idle time $T_{IDLE2}$ is shorter than idle time $T_{IDLE1}$ and idle time $T_{IDLE3}$ is shorter than idle time $T_{IDLE2}$. As the load current continues to increase, the PFM operation mode is not able to maintain the output voltage and the output voltage droops, as manifested in the drooping of the feedback voltage near time T5. When the load current demand increases sufficiently, a transition to PWM mode is imminent. An ideal boundary (time T5) between PFM and PWM modes of operation occurs when the inductor current pulses come very close to each other and the idle time reduces to zero. When the boost regulator 50 transition to PWM mode of operation at time T5, the feedback voltage $V_{FB}$ is regulated to the reference voltage $V_{REF2}$ which is smaller than the reference voltage $V_{REF1}$. Under PWM mode, the inductor current $I_L$ does not decreases to zero current level and the first and second power switches are turned on and off continuously to supply output current to the load to meet the increasing load current demand.

In embodiments of the present invention, the timer based PFM exit control method makes use of the behavior of the idle time in response to increasing load conditions to determine the transition point from PFM mode to PWM mode in the boost regulator. More specifically, the idle time in the PFM mode is large when the boost regulator is under light load conditions and the idle time progressively decreases with increasing load conditions. In one embodiment, the timer based PFM exit control method measures the idle time in PFM mode and compares the idle time in PFM mode to a timer threshold duration. When the idle time becomes equal to or less than the timer threshold duration, the timer based PFM exit control method determines that the boost regulator should exit the PFM mode of operation and asserts the Exit_PFM signal. The Exit_PFM signal can be used by a mode selection circuit, such as the mode selection circuit 75 in FIG. 2, of the boost regulator to transition the boost regulator out of the PFM mode and into the PWM mode.

The ideal value of the timer threshold duration is nearly zero as zero idle time is the ideal boundary between PFM and PWM modes. However, practical circuits have finite delay times. Thus, in embodiments of the present invention, the timer threshold duration has a finite non-zero value that is designed to be as small as possible. In some embodiments, the timer threshold duration has a zero or near zero time value. A salient feature of the timer based PFM exit control method of the present invention is that information from the feedback voltage $V_{FB}$ is not required to determine the PFM exit point. Instead, changes in output load condition is detected as changes in idle time of the inductor current and the idle time is used to determine the point of PFM exit. The timer based PFM exit control employing idle time information is capable of determining the ideal point of PFM exit in a PFM/PWM boost regulator and enables a clean transition into PWM mode.

Returning to FIG. 4, the boost regulator 50 incorporates the timer based PFM exit control circuit 70 for controlling the transition from PFM mode to PWM mode. The timer based PFM exit control circuit 70 receives the control signal NGATE, the zero-cross signal ZC and a timer reference voltage signal $V_{TIMER-REF}$. The timer based PFM exit control circuit 70 uses the control signal NGATE, the zero-cross signal ZC to assess the idle time of the inductor current. The timer based PFM exit control circuit 70 determines when the boost regulator 50 should exit the PFM mode based on the idle time assessment and the timer reference voltage signal $V_{TIMER-REF}$. The timer reference voltage signal $V_{TIMER-REF}$ is representative of the timer threshold duration for the idle time. When the timer based PFM exit control circuit 70 determines that the idle time assessment has shortened to a value below the timer threshold duration represented by the timer reference voltage signal $V_{TIMER-REF}$, the circuit 70 asserts the Exit_PFM signal (node 72) to cause the boost regulator 50 to transition to the PWM mode of operation.

Figure 6:
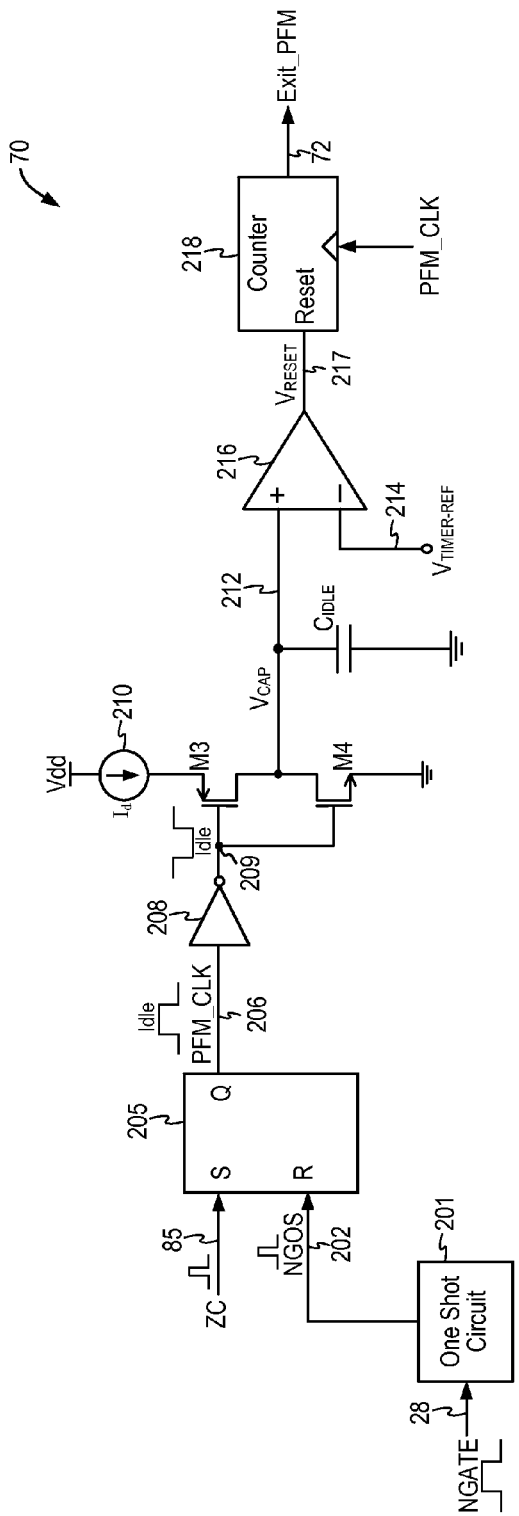
FIG. 6 is a schematic diagram illustrating the implementation of the timer based PFM exit control circuit according to one embodiment of the present invention.

FIG. 6 is a schematic diagram illustrating the implementation of the timer based PFM exit control circuit according to one embodiment of the present invention. Referring to FIG. 6, the timer based PFM exit control circuit 70 ("control circuit 70") includes a one-shot circuit 201 configured to receive the control signal NGATE and to generate a one-shot signal NGOS (node 202) when the control signal NGATE is asserted. Control circuit 70 further includes a SR-flip-flop 205 having a reset input terminal coupled to receive the one shot signal NGOS and a set input terminal coupled to receive the zero-cross signal ZC. The SR-flip-flop 205 generates an output signal Q (node 206) being a PFM clock signal (PFM_CLK). Under the PFM mode of operation, the control signals NGATE and PGATE do not operate on a fixed clock frequency. Therefore, the PFM operation mode does not inherently use a PFM clock. The SR-flip-flop 205 generates the PFM clock signal for use by the control circuit 70 to determine the idle time of the inductor current. The PFM clock signal thus generated has a logical high level with a logical high level duration representing the idle time of the inductor current. The PFM clock signal is coupled to an inverter 208 to generate an inverse of the PFM clock signal (node 209). Accordingly, the inverted PFM clock signal has a logical low level with a logical low level duration representing the idle time of the inductor current.

The configuration of the SR-flip-flop 205 and the inverter 208 to generate the PFM clock signal (PFM_CLK) and its inverse is illustrative only. One of ordinary skill in the art would appreciate that other circuit configuration or logic circuit combination may be used to generate a PFM clock signal (PFM_CLK) having a logical high level with a logical high level duration representing the idle time.

The inverted PFM clock signal is coupled to drive a pair of serially connected PMOS transistor M3 and NMOS transistor M4. The source terminal of PMOS transistor M3 is coupled to a current source 210 providing a current $I_d$. The common node 212 between the transistors M3 and M4 is coupled to a capacitor $C_{IDLE}$. The operation of the transistors M3 and M4 under the control of the PFM clock signal (or its inverse) causes the capacitor $C_{IDLE}$ to be charged or discharged. Thus, a voltage $V_{CAP}$ develops across capacitor $C_{IDLE}$ being a sawtooth voltage waveform.

More specifically, because the gate terminals of PMOS transistor M3 and NMOS transistor M4 are coupled to the same control signal—the inverted PFM clock signal, transistor M3 and transistor M4 are alternately turned on and off. When the inverted PFM clock signal is at a logical low level (idle time), transistor M3 is turned on and transistor M4 is turned off. The current $I_d$ from current source 210 is provided to the common node 212 through transistor M3 to charge up the common node 212 during the idle time of the PFM clock signal. The voltage $V_{CAP}$ increases as a linear ramp having a time constant determined by the capacitance value of capacitor $C_{IDLE}$ and the current value of current Id. When the inverted PFM clock signal is at a logical high level (non-idle time), transistor M3 is turned off and transistor M4 is turned on. The transistor M4 discharges the common node 212 to the ground potential and the voltage $V_{CAP}$ decreases to zero volts.

With the PFM clock signal switching in accordance with the NGATE signal and the zero-cross signal ZC, the capacitor $C_{IDLE}$ is being charged and discharged and the voltage $V_{CAP}$ developed at node 212 is increased or decreased. When the idle time is long, the inverted PFM clock signal is at a logical low level for a long time and the voltage $V_{CAP}$ can be charged up to a large peak voltage value. When the idle time is short, the inverted PFM clock signal is at a logical low level for only a short time so that the voltage $V_{CAP}$ charges up to a small peak voltage value.

The voltage $V_{CAP}$ is coupled to a comparator 216 to be compared with the timer reference voltage signal $V_{TIMER\text{-}REF}$. The output of the comparator 216 is an idle time indicator signal $V_{RESET}$ and is coupled to drive the reset terminal of a counter 218. The counter 218 is clocked by the PFM clock signal to increment the count value for each clock pulse of the PFM clock signal.

When the idle time is long and the voltage $V_{CAP}$ is allowed to charge up to a peak voltage value that exceeds the timer reference voltage signal $V_{TIMER\text{-}REF}$, the reset signal for the counter 218 is asserted and the counter 218 is reset. The count value of the counter 218 returns to zero at every clock cycle when the voltage $V_{CAP}$ exceeds the timer reference voltage signal $V_{TIMER\text{-}REF}$. In that case, the Exit_PFM signal is not asserted.

When the idle time is short, the voltage $V_{CAP}$ will not be able to charge up to the voltage level of signal $V_{TIMER\_REF}$ and thus, the reset signal for the counter 218 is not asserted. In that case, the counter 218 is allowed to increment its count value when triggered by the pulses of the PFM clock signal. When the count value of the counter 218 reaches a count threshold, the counter 218 asserts the Exit_PFM signal. The Exit_PFM signal is used by the mode selection circuit, such as the mode selection circuit 75 in FIG. 2, to cause the boost regulator to transition out of PFM mode and transition into PWM mode. In some embodiments, the count threshold is 5. In other embodiments, other count threshold values can be used.

In this manner, when the idle time is long, the voltage $V_{CAP}$ is allowed to charge up to a large peak voltage value to keep the counter in reset. When the count value of the counter remains below the count threshold, the timer based PFM exit control circuit 70 determines that the PFM mode of operation is still appropriate for the load condition. However, when the idle time is short, the voltage $V_{CAP}$ can only charge up to a lesser peak voltage value less than the timer reference voltage signal which prevents the counter from being reset. Thus, the counter is allowed to count up or increment its count value. When the count value of the counter reaches the count threshold, the timer based PFM exit control circuit 70 determines that the load condition has changed sufficiently such that the boost regulator should exit the PFM mode of operation and asserts the Exit_PFM signal.

The timer based PFM exit control circuit of FIG. 6 is illustrative only. In the embodiment shown in FIG. 6, the timer threshold duration for measuring the idle time is assessed based on charging and discharging a capacitor and using a timer reference voltage signal. In other embodiments, the timer threshold duration for measuring the idle time can be assessed using other methods and other timer reference signal which can be a voltage signal or a current signal.

Figure 7:
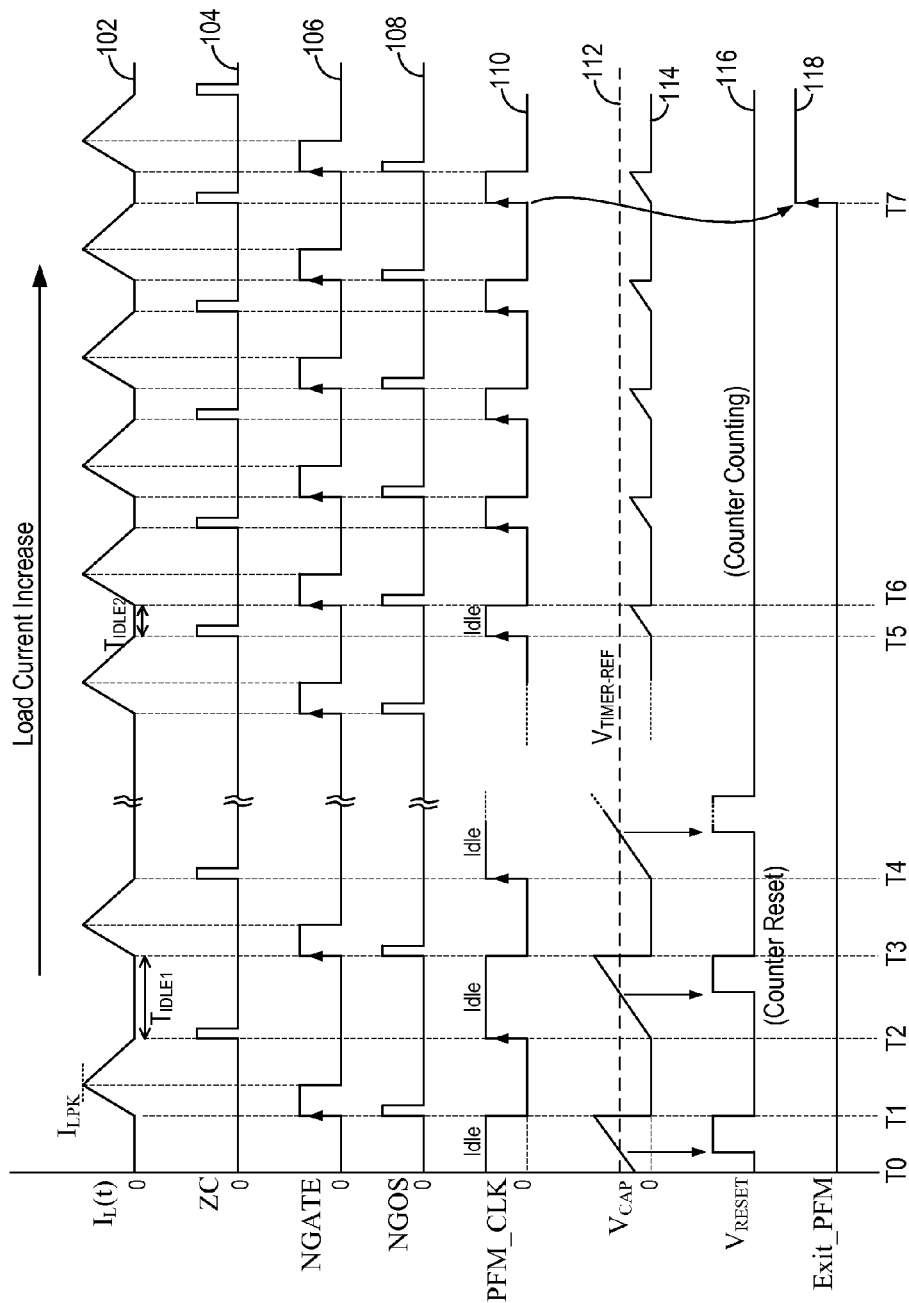
FIG. 7 is a timing diagram illustrating the operation of the timer based PFM exit control circuit of FIG. 6 according to one embodiment of the present invention.

FIG. 7 is a timing diagram illustrating the operation of the timer based PFM exit control circuit of FIG. 6 according to one embodiment of the present invention. In particular, FIG. 7 illustrates the behavior of the inductor current $I_L(t)$ (curve 102), the zero-cross signal ZC (curve 104), the control signal NGATE (curve 106), the one-shot signal NGOS (curve 108), the PFM clock (PFM_CLK) signal (curve 110), the voltage $V_{CAP}$ (curve 114), the counter reset signal (curve 116) and the Exit_PFM signal (curve 118) as the load current is increasing. Referring to FIG. 7, the boost regulator at time T0 is operating in the PFM mode under light load condition. The inductor current $I_L(t)$ pulses are triangular waveforms with an Idle time $T_{IDLE1}$ between the pulses. In particular, the idle time $T_{IDLE}$ is the time period between the point the inductor current reaches zero current level (zero cross) and the point when the PFM control loop commands another inductor current pulse (that is, the start of the following NGATE signal). The control signal NGATE is asserted when the feedback voltage $V_{FB}$ has fallen below the reference voltage $V_{REF1}$, as previously described.

When the control signal NGATE is asserted (e.g. at time T1), the one-shot signal NGOS is asserted and the PFM clock signal is reset to the logical low level (non-idle). Then, when the zero-cross signal ZC is asserted, the PFM clock signal is set to the logical high level to indicate the start of the idle time. Accordingly, the idle time is given as the time difference between the rising edge of the zero-cross signal ZC and the rising edge of the NGATE signal.

When the PFM clock signal is at a logical high level, indicating idle time, the voltage $V_{CAP}$ is ramped up, such as by charging the capacitor $C_{IDLE}$ in FIG. 6. When the PFM clock signal is at a logical low level (non-idle time), the voltage $V_{CAP}$ is discharged to the ground potential. When the idle time is long, such as at time T2 to T3, the voltage $V_{CAP}$ is allowed to charge up to a voltage value exceeding the timer reference voltage signal $V_{TIMER\text{-}REF}$ (curve 112). When the voltage $V_{CAP}$ exceeds the timer reference voltage signal $V_{TIMER\text{-}REF}$, the counter reset signal is asserted and the counter resets the count value. When the counter count value is being reset or is below the count threshold, the Exit_PFM signal is not asserted and the boost regulator remains operating in the PFM mode.

However, as load current demand increases, the frequency of the inductor current pulses increases to support this rising load and the idle time $T_{IDLE}$ becomes shorter (e.g. time T5 to T6), as shown by idle time $T_{IDLE2}$ being shorter than idle time $T_{IDLE1}$. The PFM clock signal now has shorter time duration in the logical high level to indicate the idle time. The shorter idle time prevents the voltage $V_{CAP}$ to be charged up to the timer reference voltage signal $V_{TIMER\text{-}REF}$. Thus, the counter reset signal is not asserted and the counter is allowed to increment its count value at each PFM clock pulse. When the count value reaches the count threshold, such as 5, the Exit_PFM signal is asserted (time T7).

As thus configured, the idle time is compared to a timer threshold duration having a period set as $T_{IDLE\_THRESHOLD} = C_{IDLE} * V_{TIMER\text{-}REF}/I_d$, where $I_d$ is the current provided by the current source 210 (FIG. 6) to charge the capacitor $C_{IDLE}$. That is, the timer threshold duration is set as the time for the voltage $V_{CAP}$ to be charged up to the voltage $V_{TIMER\text{-}REF}$ with the charging current $I_d$. When the idle time is longer than the timer threshold duration, the voltage $V_{CAP}$ is charged up to the reference voltage $V_{TIMER\text{-}REF}$ and the boost regulator can remain in the PFM mode. But as the load increases and a transition to PWM mode is needed, the idle time shortens to be below the timer threshold duration and the voltage $V_{CAP}$ can no longer charge up to the reference voltage $V_{TIMER\text{-}REF}$. When short idle time is detected for a sufficient period of time, the Exit_PFM signal is asserted to transition the boost regulator out of the PFM mode.

In the present embodiment, the count threshold is used to provide a filtering function before the Exit_PFM signal is asserted. That is, the value of the count threshold can be selected to ensure that the idle time is not fluctuating but has indeed decreased below the timer threshold duration consistently such that the Exit_PFM signal needs to be asserted. For example, in the present embodiment, the count threshold is 5. If the idle time has shortened so that the counter has count up to 3 when the idle time becomes long again and the counter is reset, then the Exit_PFM signal is not asserted as the counter has not yet counted up to the count threshold. In other embodiments, other count threshold values can be used, such as 1 or more.

Figure 8:
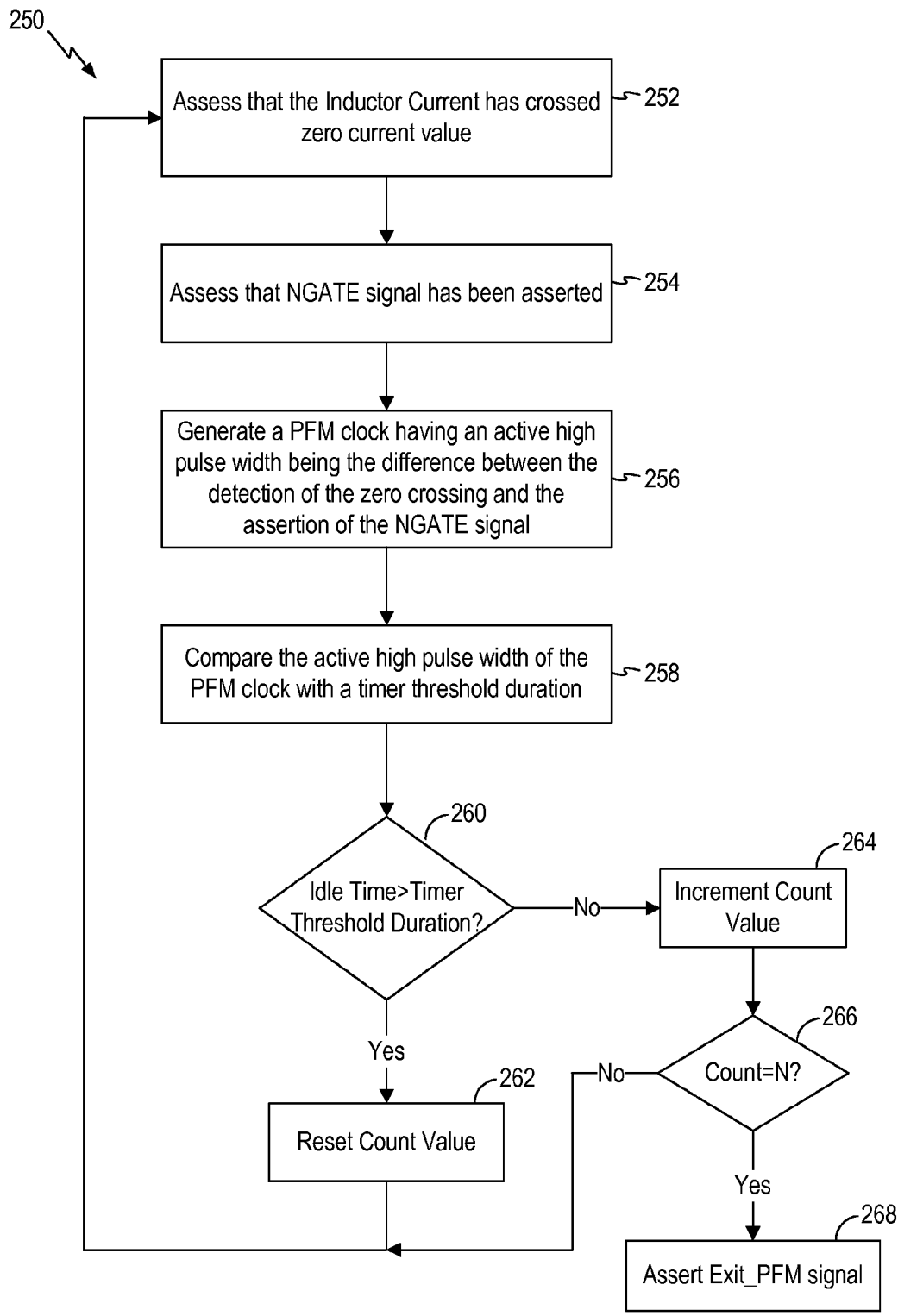
FIG. 8 is a flow chart illustrating a timer based PFM exit control method in embodiments of the present invention.

FIG. 8 is a flow chart illustrating a timer based PFM exit control method in embodiments of the present invention. Referring to FIG. 8, a timer based PFM exit control method 250 starts by assessing that the inductor current has crossed the zero current value (252). The method 250 further assesses that the control signal NGATE has been asserted (254). The method 250 generates a PFM clock signal having an active high pulse width being the time difference between the detection of the inductor current zero crossing and the asserting of the NGATE signal (256). The active high pulse width of the PFM clock signal is indicative of the idle time of the inductor current. In other embodiments, an active low pulse width of the PFM clock signal can be used to indicate the idle time.

Method 250 then compares the active high pulse width of the PFM clock signal (the idle time) with the timer threshold duration (258). For example, the timer threshold duration can be established as the time it takes to charge a capacitor voltage to a reference voltage value (e.g. $V_{TIMER-REF}$) using a given charging current. The method 250 determines if the idle time, as indicated by the active high pulse width of the PFM clock signal, is greater than the timer threshold duration (260). If the idle time is greater than the timer threshold duration, then method 250 resets the count value (262). Method 250 returns to 252 to assess the next zero crossing of the inductor current. If the idle time is less than the timer threshold duration, then method 250 increments the count value (264). Method 250 determines if the count value has reached the count threshold N (266). When the count value is less than N, method 250 returns to 252 to assess the next zero crossing of the inductor current. When the count value reaches the count threshold N, method 250 asserts the Exit_PFM signal (268).

The timer based PFM exit control circuit and method provides many advantages over conventional PFM/PWM mode selection methods. First, the timer based PFM exit control circuit and method do not rely on the feedback voltage to determine the PFM exit point. Therefore, the boost regulator may employ ripple injection in the PFM mode without affecting the mode transition operation. The timer based PFM exit control circuit and method of the present invention uses the idle time of the inductor current to determine the transition point from PFM mode to PWM mode.

Second, although the ideal idle time for the PFM exit is zero, practical considerations results in a non-zero value as the timer threshold duration for the transition. However, the timer threshold duration can be selected to optimize the boost regulator operation. More specifically, the timer threshold duration can be selected to prevent excessive output voltage droop or to optimize the efficiency of the boost regulator.

For instance, with the boost regulator operating in the PFM mode, as the load increases, the output voltage can start experiencing a droop, as illustrated in FIG. 5 by the feedback voltage (curve 93). According to embodiments of the present invention, the value of the timer threshold duration can be advantageously selected to reduce the amount of output voltage droop that may occur during the transition period. In particular, the timer threshold duration can be selected to have a large value so that the timer based PFM exit control circuit and method will assert the Exit_PFM signal when the idle time has reduced to a value that is appreciably longer than the ideal idle time of zero. In this manner, the boost regulator may exit the PFM mode before the output voltage droops excessively due to increasing load conditions. Instead, the boost regulator is transitioned to operate in the PWM mode to handle the increasing load conditions. As thus operated, the boost regulator may exit the PFM mode for a lighter load than the theoretical maximum and thus the boost regulator may lose out on the efficiency advantage of PFM mode for that load condition. However, excessive output voltage droop is prevented and the output voltage can be maintained at a more stable value over varying load conditions.

In other embodiments, the value of the timer threshold duration can be advantageously selected to optimize the efficiency of the boost regulator. In particular, the timer threshold duration can be selected to have as small a value as possible so that the timer based PFM exit control circuit and method will assert the Exit_PFM signal only when the idle time has reduced to a value that is very close to the ideal time of zero. Although the output voltage droop may be greater as thus operated, the boost regulator is operated in the PFM mode for the maximum possible period to reap the efficiency advantage of the PFM mode.

In embodiments of the present invention, the timer threshold duration value is selected as follows. An acceptable output voltage droop is selected and the corresponding load current $I_O$ is noted. The idle time for this load current is the timer threshold duration for which the timer based PFM exit control circuit and method should assert the Exit_PFM signal. As thus selected, the timer threshold duration is selected so that the transition point occurs for a load current $I_O$ that corresponds to the acceptable output voltage droop.

In some embodiments, the PFM operation boundary can be extended by modulating the peak inductor current $I_{LPK}$ as a function of the load current $I_O$, the output voltage $V_{OUT}$ and the input voltage $V_{IN}$. Furthermore, in other embodiments, the capacitance of the capacitor $C_{IDLE}$, the current $I_d$ and the timer reference voltage signal $V_{TIMER-REF}$ may be modulated with the input voltage $V_{IN}$ and the output voltage $V_{OUT}$ such that the timer threshold duration is independent of the input voltage or the output voltage to extend the maximum efficiency range.

In the above described embodiments, the timer based PFM exit control circuit and method is applied to a boost switching regulator. In other embodiments, the timer based PFM exit control circuit and method can be applied to buck switching regulators, buck-boost or other switching topology that operate in PFM and PWM modes. The present description is illustrative only and not intended to be limiting.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A control circuit in a boost switching regulator, the boost switching regulator being configured to receive an input voltage on a first terminal of an inductor and to generate a regulated output voltage on an output terminal for driving a load, the boost switching regulator comprising a main power switch coupled between a second terminal of the inductor and ground, a synchronous rectifier coupled between the second terminal of the inductor and the output terminal, and an output capacitor coupled to the output terminal and ground, the control circuit being configured to control the main power switch and the synchronous rectifier using a Pulse Frequency Modulation (PFM) feedback control loop for light load conditions and using a Pulse Width Modulation (PWM) feedback control loop for heavy load conditions, the regulated output voltage being fed back to the boost switching regulator as a feedback voltage on a feedback node of the PFM and PWM feedback control loops, the control circuit comprising:

a timer based PFM exit control circuit configured to receive a first control signal for controlling the main power switch, a zero-cross signal indicative of an inductor current flowing through the inductor having reached a zero current value, and a timer reference signal, the timer reference signal being indicative of a timer threshold duration, the timer based PFM exit control circuit assessing an idle time of the inductor current based on the first control signal and the zero-cross signal, the idle time being a time period when the inductor current has the zero current value in a switching cycle, the timer based PFM exit control circuit generating a PFM exit signal, wherein the timer based PFM exit control circuit measures the idle time as being the time period in the switching cycle between the zero-cross signal being asserted to indicate the inductor current having reached a zero current value and the first control signal being asserted to turn on the main power switch, the timer based PFM exit control circuit asserts the PFM exit signal in response to the idle time decreasing below a level equal to or less than the timer threshold duration, and the boost switching regulator transitions out of the PFM feedback control loop and into the PWM feedback control loop in response to the PFM exit signal being asserted.

2. The control circuit of claim 1, wherein the timer threshold duration has a zero value or near-zero value.

3. The control circuit of claim 1, wherein the timer based PFM exit control circuit generates a PFM clock signal in response to the first control signal and the zero-cross signal being asserted, the PFM clock signal having a pulse width at a first logical level indicative of the idle time.

4. The control circuit of claim 3, wherein the PFM clock signal has a pulse width at an active high or active low level indicative of the idle time.

5. The control circuit of claim 3, wherein the timer based PFM exit control circuit generates the PFM clock signal in response to the first control signal and the zero-cross signal, the PFM clock signal transitioning to the first logical level in response to the zero-cross signal being asserted and transitioning to a second, opposite logical level in response to the first control signal being asserted, wherein a time period when the PFM clock is at the first logical level is the idle time.

6. The control circuit of claim 5, wherein the timer based PFM exit control circuit comprises:

a first capacitor configured to be charged by a first current in response to the PFM clock signal at the first logical level and configured to be discharged to ground in response to the PFM clock signal at the second logical level, a first voltage being developed across the first capacitor as a result of the charging and discharging;

a comparator configured to compare the first voltage to the timer reference voltage signal, the comparator generating an output signal having a first logical state when the first voltage is greater than the timer reference voltage signal; and a counter having a reset input terminal coupled to receive the output signal of the comparator and a clock input signal coupled to receive the PFM clock signal, the counter generating an output signal being the PFM exit signal, wherein the counter has a count value that is reset in response to the output signal of the comparator having the first logical state and the count value is incremented in response to the PFM clock signal when the output signal of the comparator does not have the first logical state, the counter asserting the PFM exit signal in response to the count value reaching a count threshold.

7. The control circuit of claim 6, wherein the count threshold is one or more.

8. The control circuit of claim 3, wherein the timer based PFM exit control circuit asserts the PFM exit signal in response to the idle time being equal to or less than the timer threshold duration for a plurality of consecutive pulses of the PFM clock signal.

9. A method for controlling a boost switching regulator, the boost switching regulator being configured to receive an input voltage on a first terminal of an inductor and to generate a regulated output voltage on an output terminal for driving a load, the boost switching regulator comprising a main power switch coupled between a second terminal of the inductor and ground, a synchronous rectifier coupled between the second terminal of the inductor and the output terminal, and an output capacitor coupled to the output terminal and ground, the method being configured to control the main power switch and the synchronous rectifier using a Pulse Frequency Modulation (PFM) feedback control loop for light load conditions and using a Pulse Width Modulation (PWM) feedback control loop for heavy load conditions, the regulated output voltage being fed back to the boost switching regulator as a feedback voltage on a feedback node of the PFM and PWM feedback control loops, the method comprising:

assessing a zero-cross signal in response to an inductor current flowing through the inductor having reached zero current value in a switching cycle;

assessing a first signal in response to a first control signal for controlling the main power switch being asserted to turn on the main power switch;

assessing an idle time of the inductor current as being a time duration in the switching cycle between the zero-cross signal being asserted and the first signal being asserted;

comparing the idle time to a timer threshold duration; and asserting a PFM exit signal in response to the idle time decreasing below a level equal to or less than the timer threshold duration.

10. The method of claim 9, further comprising:

transitioning the boost switching regulator out of the PFM feedback control loop and into the PWM feedback control loop in response to the PFM exit signal being asserted.

11. The method of claim 9, wherein the timer threshold duration has a zero value or near-zero value.

12. The method of claim 9, further comprising:

generating a PFM clock signal in response to the first signal and the zero-cross signal being asserted, the PFM clock signal having a pulse width at a first logical level indicative of the idle time.

13. The method of claim 12, wherein the PFM clock signal has a pulse width at an active high or active low level indicative of the idle time.

14. The method of claim 12, wherein generating the PFM clock signal comprises:

transitioning the PFM clock signal to the first logical level in response to the zero-cross signal being asserted;

transitioning the PFM clock signal to a second, opposite logical level in response to the first control signal being asserted, wherein a time period when the PFM clock is at the first logical level is the idle time.

15. The method of claim 14, further comprises:

generating a first voltage in response to the PFM clock signal, the first voltage being charged up by a first current in response to the PFM clock signal being at the first logical level, and being discharged to ground in response to the PFM clock signal at the second logical level;

comparing the first voltage to a timer reference voltage signal;

generating a comparator output signal having a first logical state when the first voltage is greater than the timer reference voltage signal;

resetting a count value in response to the comparator output signal having the first logical state;

incrementing the count value at each clock pulse of the PFM clock signal when the comparator output signal does not have the first logical state; and asserting the PFM exit signal in response to the count value reaching a count threshold.

16. The method of claim 15, wherein the count threshold is one or more.

17. The method of claim 12, further comprises:

asserting a PFM exit signal in response to the idle time being equal to or less than the timer threshold duration for a plurality of consecutive pulses of the PFM clock signal.

* * * * *